(12) United States Patent
Hwang et al.

(10) Patent No.: US 7,702,959 B2
(45) Date of Patent: Apr. 20, 2010

(54) ERROR MANAGEMENT SYSTEM AND METHOD OF USING THE SAME

(75) Inventors: Min Jae Hwang, Seoul (KR); Hyun-Woo Park, Seoul (KR)

(73) Assignee: NHN Corporation, Seongnam-si (KR)

( * ) Notice: Subject to any disclaimer, the term of this patent is extended or adjusted under 35 U.S.C. 154(b) by 766 days.

(21) Appl. No.: 11/498,121

(22) Filed: Aug. 1, 2006

(65) Prior Publication Data

US 2007/0033281 A1   Feb. 8, 2007

(30) Foreign Application Priority Data

Aug. 2, 2005 (KR) .................... 10-2005-0070726
Aug. 11, 2005 (KR) .................... 10-2005-0073870

(51) Int. Cl.
*G06F 11/00* (2006.01)
(52) U.S. Cl. .............................. 714/38; 714/37; 714/48
(58) Field of Classification Search .............. 714/37, 714/38, 48, 57
See application file for complete search history.

(56) References Cited

U.S. PATENT DOCUMENTS

| | | | | |
|---|---|---|---|---|
| 5,335,341 A * | 8/1994 | Chana | ........................... | 714/37 |
| 5,673,386 A * | 9/1997 | Batra | ........................... | 714/38 |
| 5,999,972 A * | 12/1999 | Gish | ........................... | 709/219 |
| 6,141,777 A * | 10/2000 | Cutrell et al. | ................... | 714/47 |
| 6,430,707 B1 * | 8/2002 | Matthews et al. | ............... | 714/37 |
| 6,629,267 B1 * | 9/2003 | Glerum et al. | ................. | 714/38 |
| 6,665,824 B1 * | 12/2003 | Ruhlen et al. | .................. | 714/57 |
| 6,718,482 B2 * | 4/2004 | Sato et al. | ........................ | 714/4 |
| 6,883,120 B1 * | 4/2005 | Banga | ........................... | 714/47 |
| 6,891,930 B1 * | 5/2005 | Staub et al. | ............... | 379/32.01 |
| 6,944,659 B2 * | 9/2005 | Taggart et al. | ............... | 709/224 |
| 6,947,957 B1 * | 9/2005 | Lange | ........................... | 707/200 |
| 7,028,223 B1 * | 4/2006 | Kolawa et al. | ................. | 714/38 |
| 7,036,052 B2 * | 4/2006 | Pierce et al. | ................... | 714/57 |
| 7,039,833 B2 * | 5/2006 | Knuutila et al. | ............... | 714/38 |
| 7,058,860 B2 * | 6/2006 | Miller et al. | ................... | 714/47 |
| 7,062,681 B2 * | 6/2006 | Larsson et al. | ................ | 714/39 |
| 7,127,642 B2 * | 10/2006 | Wang et al. | ................... | 714/45 |
| 7,167,893 B1 * | 1/2007 | Malone et al. | ............... | 709/201 |
| 7,168,009 B2 * | 1/2007 | Darringer et al. | ............. | 714/38 |
| 7,185,231 B2 * | 2/2007 | Mullally et al. | ............... | 714/38 |

(Continued)

FOREIGN PATENT DOCUMENTS

| KR | 10-2001-0079612 | 8/2001 |
|---|---|---|
| KR | 10-2004-0076904 A | 9/2004 |

*Primary Examiner*—Robert Beausoliel
*Assistant Examiner*—Joshua P Lottich
(74) *Attorney, Agent, or Firm*—H.C. Park & Associates, PLC

(57) ABSTRACT

An error management system for managing an error occurring in a client application includes: a client terminal which intercepts an event, and collects error information and a crash dump file when the client application is abnormally terminated, and transmits the collected error information and the crash dump file in a predetermined format via a network; and an error collecting server which receives the error information and the crash dump file from the client terminal, and stores the received error information and the crash dump file for each online service, the error collecting server being independent from an online service server that executes a server application providing a service in correspondence to the client application.

18 Claims, 9 Drawing Sheets

U.S. PATENT DOCUMENTS

| | | | |
|---|---|---|---|
| 7,191,364 B2* | 3/2007 | Hudson et al. | 714/38 |
| 7,257,743 B2* | 8/2007 | Glerum et al. | 714/48 |
| 7,320,016 B2* | 1/2008 | Walsh et al. | 709/200 |
| 7,373,554 B2* | 5/2008 | Chandrasekaran | 714/38 |
| 7,395,525 B2* | 7/2008 | Softky | 717/125 |
| 7,398,530 B1* | 7/2008 | Parla et al. | 719/318 |
| 7,421,490 B2* | 9/2008 | Bharati et al. | 709/224 |
| 7,484,134 B2* | 1/2009 | Wolf et al. | 714/57 |
| 7,490,268 B2* | 2/2009 | Keromytis et al. | 714/38 |
| 2002/0124209 A1* | 9/2002 | Faust et al. | 714/37 |
| 2003/0005102 A1* | 1/2003 | Russell | 709/223 |
| 2003/0055931 A1* | 3/2003 | Cravo De Almeida et al. | 709/223 |
| 2003/0088666 A1* | 5/2003 | Engel | 709/224 |
| 2003/0214943 A1* | 11/2003 | Engstrom et al. | 370/353 |
| 2003/0217149 A1* | 11/2003 | Crichton et al. | 709/225 |
| 2004/0054989 A1* | 3/2004 | Harres | 717/124 |
| 2004/0078689 A1* | 4/2004 | Knuutila et al. | 714/38 |
| 2004/0107415 A1* | 6/2004 | Melamed et al. | 717/124 |
| 2004/0117731 A1* | 6/2004 | Blyashov | 715/507 |
| 2004/0153823 A1* | 8/2004 | Ansari | 714/38 |
| 2004/0168174 A1* | 8/2004 | Baker | 719/310 |
| 2004/0205327 A1* | 10/2004 | Morrison et al. | 713/1 |
| 2004/0205421 A1* | 10/2004 | Glerum et al. | 714/57 |
| 2005/0081108 A1* | 4/2005 | Shabalin | 714/38 |
| 2005/0251812 A1* | 11/2005 | Hayward | 719/328 |
| 2006/0026467 A1* | 2/2006 | Nehab et al. | 714/38 |
| 2006/0059253 A1* | 3/2006 | Goodman et al. | 709/223 |
| 2006/0143430 A1* | 6/2006 | Morrison et al. | 713/1 |
| 2006/0200450 A1* | 9/2006 | Keane et al. | 707/3 |
| 2008/0109679 A1* | 5/2008 | Wright et al. | 714/37 |
| 2008/0229160 A1* | 9/2008 | Prescott et al. | 714/57 |
| 2008/0250078 A1* | 10/2008 | Wimberly et al. | 707/202 |
| 2008/0263406 A1* | 10/2008 | Prescott et al. | 714/38 |
| 2008/0307266 A1* | 12/2008 | Chandrasekaran | 714/38 |
| 2008/0307267 A1* | 12/2008 | Chandrasekaran | 714/38 |
| 2009/0013222 A1* | 1/2009 | Di Luoffo et al. | 714/57 |
| 2009/0124387 A1* | 5/2009 | Perlman et al. | 463/42 |

\* cited by examiner

FIG. 5

| address | reason | callstack | register | version | modinfo | dumplink | wberscount |
|---|---|---|---|---|---|---|---|
| 10018BB9 | EXCEPTION_FLT_DIVIDE_BY_ZERO | 10018BBB | EAX:FFFFFFE2 EBX:029D2420 ECX:00000000 EDX:0000001E ESI:021EC1D8 EDI:0000000F EBP:00000000 EIP:00000000 SegCs:0000001B EFlags:00010286 Esp:00010286 SegGS:00000000 | 050527_0033dd56 | with 57 dll(s) | ---- | 286 |
| 1000E119 | EXCEPTION_ACCESS_VIOLATION | 1000E119 7C1584A3 C8B8C37C | EAX:00000000 EBX:00845F45 ECX:0292DC60 EDX:100355CC ESI:0292DC60 EDI:32656168 EBP:155DC888 EIP:00000000 SegCs:0000001B EFlags:00010246 Esp:155DC8C0 SegGS:00000000 | 050603_00343af9 | with 56 dll(s) | ---- | 79 |
| 01C772FC | EXCEPTION_ACCESS_VIOLATION | 01C772FC | EAX:0278A6A8 EBX:027195E0 ECX:0012E788 EDX:0000029F ESI:00000000 EDI:00000000 EBP:6061A6A0 EIP:00000000 SegCs:0000001B EFlags:00010246 Esp:0012E878 SegGS:00000000 | 050603_00343af9 | with 57 dll(s) | ---- | 77 |
| 0040368E | EXCEPTION_ACCESS_VIOLATION | 0040368E | EAX:0278A6A8 EBX:FFFFFFFF ECX:0012FF00 EDX:00040003 ESI:00000000 EDI:0040E3E4 EBP:FFFFFFFF EIP:00000000 SegCs:0000001B EFlags:00010246 Esp:00000007 SegGS:00000000 | 050603_00343af9 | with 57 dll(s) | ---- | 69 |
| 00000000 | EXCEPTION_ACCESS_VIOLATION |  | EAX:02716D88 EBX:00000000 ECX:05FAA8A8 EDX:00000000 ESI:05FAA8A8 EDI:00000000 EBP:77CFD7F9 EIP:00000000 SegCs:0000001B EFlags:00010246 Esp:0012EFB4 SegGS:00000000 | 050527_0033dd56 | with 57 dll(s) | ---- | 47 |
| 10007370 | EXCEPTION_ACCESS_VIOLATION | 10007370 7C16E0B0 7C16E14F 7C16E1B8 7C16E1F6 77CF8734 77CF8816 77CF89CD 77CF8A10 77D0E097 --- | EAX:00000000 EBX:10007360 ECX:77CF882A EDX:0014F0D8 ESI:027E1CE0 EDI:027E1CE0 EBP:00000000 EIP:00000000 SegCs:0000001B EFlags:00010202 Esp:00000008 SegGS:00000000 | 050603_00343af9 | with 53 dll(s) | ---- | 37 |
|  |  | 003C210A 7C171915 7C175CD8 |  |  |  |  |  |

* SUBJECT EXCEPTION
   TEMPLATE : exception
Create a new table per : day
   Query from : [20050605 ▼] [delete]
      to : ☐

MAKE A QUERY (610)

select [ALL ▼] group by [address ▼] order by [group ▼] ⊙ desc ○ asc | where [none ▼] _____ result per page [50 ▼] | ☐ set to default custom query: select _____ from [TABLE] (where) _____ (group,order) [clear] [list]
   [submit]

(620)

QUERY RESULT (630)

select *,count(*) as wberscount from wbers_hanbaduk_exception_20050605 group by address order by wberscount desc    + add to custom query

| address (641) | reason (642) | callstack (643) | register (644) | version (645) | modinfo (646) | dumplink (647) | wberscount (648) |
|---|---|---|---|---|---|---|---|
| 10018BB9 | EXCEPTION_FLT_DIVIDE_BY_ZERO | 10018BBB | EAX:FFFFFFE2 EBX:029D2420 ECX:00000000 EDX:0000001E ESI:021EC1D8 EDI:0000000F EBP:00000000 EIP:00000000 SegCs:0000001B EFlags:000010286 Esp:000000008 SegGS:00000000 | 050527_0033dd56 | with 57 dll(s) | - - - - | 286 |
| 1000E119 | EXCEPTION_ACCESS_VIOLATION | 1000E119 7C1584A3 C8B8C37C | EAX:00000000 EBX:00845F45 ECX:0292DC60 EDX:10035ECC ESI:0292DC60 EDI:32656168 EBP:155DC8B8 EIP:00000000 SegCs:0000001B EFlags:000010246 Esp:155DC8C0 SegGS:00000000 | 050603_00343af9 | with 56 dll(s) | - - - - | 79 |
| 01C772FC | EXCEPTION_ACCESS_VIOLATION | 01C772FC | EAX:0278A6A8 EBX:027195E0 ECX:0012E788 EDX:0000029F ESI:00000000 EDI:00000000 EBP:6061A6A0 EIP:00000000 SegCs:0000001B EFlags:000010246 Esp:0012E878 SegGS:00000000 | 050603_00343af9 | with 57 dll(s) | - - - - | 77 |
| 0040368E | EXCEPTION_ACCESS_VIOLATION | 0040368E | EAX:0278A6A8 EBX:FFFFFFFF ECX:0012FF00 EDX:00040003 ESI:00000000 EDI:0040F3E4 EBP:FFFFFFFF EIP:00000000 SegCs:0000001B EFlags:000010246 Esp:00000007 SegGS:00000000 | 050603_00343af9 | with 57 dll(s) | - - - - | 69 |
| 00000000 | EXCEPTION_ACCESS_VIOLATION |  | EAX:02716D88 EBX:00000000 ECX:05FAA8A8 EDX:00000000 ESI:05FAA8A8 EDI:00000000 EBP:77CFD7F9 EIP:00000000 SegCs:0000001B EFlags:000010246 Esp:0012EFB4 SegGS:00000000 | 050527_0033dd56 | with 57 dll(s) | - - - - | 47 |
| 10007370 | EXCEPTION_ACCESS_VIOLATION | 10007370 7C16E0B0 7C16E14F 7C16E1B8 7C16E1F6 77CF8734 77CF8816 77CF89CD 77CF8A10 77D0E097 - - - | EAX:00000000 EBX:10007360 ECX:77CF882A EDX:0014F0D8 ESI:027E1CE0 EDI:027E1CE0 EBP:00000000 EIP:00000000 EFlags:000010202 Esp:000000008 SegGS:00000000 | 050603_00343af9 | with 53 dll(s) | - - - - | 37 |
|  |  | 003C210A 7C171915 7C175CD8 |  |  |  |  |  |

* CUSTOMIZE THE SUBJECT

| Field | Type | Null | Key | Default | Extra | delete |
|---|---|---|---|---|---|---|
| address | varchar(8) ▶ | YES ▶ | INDEX ▶ | | | × |
| reason | varchar(64) ▶ | YES ▶ | INDEX ▶ | | | × |
| id | varchar(24) ▶ | YES ▶ | INDEX ▶ | | | × |
| callstack | text ▶ | YES ▶ | ... ▶ | | | × |
| register | text ▶ | YES ▶ | ... ▶ | | | × |
| version | varchar(15) ▶ | YES ▶ | INDEX ▶ | | | × |
| modinfo | text ▶ | YES ▶ | ... ▶ | | | × |
| dumplink | varchar(255) ▶ | YES ▶ | ... ▶ | | | × |
| | bool ▶ | YES ▶ | + | | | ADD |

710 / 720 / 730 / 740 / 750 / 760 / 770 submit

* ALTER TABLE MANUALLY
  alter table wbers_hanbaduk_exception_tadBase :

FIG. 8

\* ANALYZE A MAP FILE

| address | module | function | source, line |
|---|---|---|---|
| 0042FF4D | 050718 (exe) | ?SetBasePos:C3DSurface:render:neon::QAEXMM:Z 0042ff40 f i GSMainObject.obj + 0xd | d:\hangame2005 \base\include\neon\3dsurface.h, 134 line |
| 004620B1 | 050718 (exe) | ?AddPassiveState:CObjectPlayer::QAEXUTPassiveInfo:::Z 00461be0 f ObjectPlayer.obj + 0x4d1 | d:\hangame2005 \dxgame\gs\objectplayer.cpp, 2087 line |
| 004656DB | 050718 (exe) | ?EatItem:CObjectPlayer::QAE_NPAVCObjectItem:::Z 00465470 f ObjectPlayer.obj + 0x26b | d:\hangame2005 \dxgame\gs\objectplayer.cpp, 2558 line |
| 0047D29E | 050718 (exe) | ?DestroyItem:CObjectWorld::QAEXHHH:Z 0047d1e0 f ObjectWorld.obj + 0xbe | d:\hangame2005 \dxgame\gs\objectplayer.cpp, 1639 line |
| 0046B966 | 050718 (exe) | ?OnPacket_DestroyItem:CObjectPlayer::QAEXPADHK:Z 0046b910 f ObjectPlayer.obj + 0x56 | d:\hangame2005 \dxgame\gs\objectplayer.cpp, 3583 line |
| 0046A7BF | 050718 (exe) | ?OnPacket:CObjectPlayer::QAEXPADHK:Z 0046a640 f ObjectPlayer.obj + 0x17f | d:\hangame2005 \dxgame\gs\objectplayer.cpp, 3333 line |
| 0046A5F4 | 050718 (exe) | ?ProcessPacker:CObjectPlayer::QAEXXZ 0046a570 f ObjectPlayer.obj + 0x84 | d:\hangame2005 \dxgame\gs\objectplayer.cpp, 3303 line |
| 0045A826 | 050718 (exe) | ?Logic:CObjectPlayer::UAEXXZ 0045a4d0 f ObjectPlayer.obj + 0x356 | d:\hangame2005 \dxgame\gs\objectplayer.cpp, 379 line |

810　820　830　840

ERROR MANAGEMENT SYSTEM AND METHOD OF USING THE SAME

CROSS-REFERENCE TO RELATED APPLICATIONS

This application claims the benefit of Korean Patent Application No. 10-2005-0070726, filed on Aug. 2, 2005, and Korean Patent Application No. 10-2005-0073870, filed on Aug. 11, 2005, in the Korean Intellectual Property Office, the disclosures of which are incorporated herein by reference.

BACKGROUND

1. Field of the Invention

The present disclosure relates to an error management system and method, and more particularly, to an error management system and method which can collect and manage an error that occurs in a client application, in an online service system including a server application and a client application.

2. Description of the Related Art

As Internet use has become widespread, an online service system, which provides an online service by a client application interoperating with a server via a network, becomes popular. In this case, the client application is installed in each user terminal and the server application is installed in a service server. Examples of the online service may include online games, such as 'Lineage', 'Kartrider', and 'You're the king of golf'.

FIG. 1 is a block diagram illustrating an online service system according to a conventional art.

Referring to FIG. 1, the online service system according to the conventional art includes client terminals 110-1, 110-2, . . . , 110-N, and online service servers 120-1, 120-2, . . . , 120-N.

Each of the client terminals 110-1, 110-2, . . . , 110-N is connected to each of the online service servers 120-1, 120-2, . . . , 120-N, via a network, such as the Internet and the like. In this case, a client application is installed in each of the client terminals 110-1, 110-2, . . . , 110-N, to perform an online service that is provided by a portion or all of the online service servers 120-1, 120-2, . . . , 120-N.

As an example, the online service server 120-1 may be a 'Lineage' game server and the online service server 120-2 may be a 'You're the king of golf' game server. In this case, a 'You're the king of golf' game client application for performing a 'You're the king of golf' game service may be installed in each of the client terminals 110-1, 110-2, . . . , 110-N.

Generally, hardware or operating systems (OS) of the client terminals 110-1, 110-2, . . . , 110-N are very diversified. Also, due to features of the online service system where the client application interoperates with the server application, the online service system shown in FIG. 1 requires a relatively complicated debugging process in comparison to debugging a general stand-alone program. Namely, when a smoothly executing client application is directly downloaded to each of the client terminals 110-1, 110-2, . . . , 110-N, and subsequently executed, an error, undetected during an application development process, may occur. Also, even when the error occurred in the client terminals 110-1, 110-2, . . . , 110-N, a program developer may not be aware of the error unless users of the client terminals 110-1, 110-2, . . . , 110-N, upload details of the error to a bulletin board of a program operator or report the error to the program operator via an e-mail. Also, when the program developer becomes aware of an occurrence of the error, the program developer may not accurately reproduce the error since the error might have been caused by a particular client terminal environment.

As an example, when the online service server 120-2 is a 'You're the king of golf' game server, the game program developer sets up a virtual client and operates the virtual client in interoperation with the online service server 120-2, and thereby, performs a 'You're the king of golf' game test. After performing the test in the virtual client, based on various client environments, and debugging all errors, the game program developer enables each of the client terminals 110-1, 110-2, . . . , 110-N, to download the game application to interoperate with a server application of the online service server 120-2. However, in many cases, an additional error that has not occurred in the test usually occurs in the client terminals 110-1, 110-2, . . . , 110-N. Accordingly, complaints from users of the client terminals 110-1, 110-2, . . . , 110-N are increased. Also, the online service server 120-2 may not know whether an error has occurred and what caused the error. Also, even when becoming aware of an occurrence of the error, the online service server 120-2 may not know the state of the client terminal 110-2 when the error occurred. Accordingly, the online service server 120-2 may not debug the error.

Accordingly, an error management system and method which can more effectively collect and manage an error of a client application that occurs in a client terminal is required.

SUMMARY

The present disclosure provides an error management system and method which can effectively collect an error that occurs in a client application, and can also manage the error without difficulty.

The present disclosure also provides an error management system and method which can intercept an event and collect error information and a crash dump file when an error occurs in a client application, and transmit the collected error information and the crash dump file, and thereby, can easily collect the error of the client application without a need for a user to report the error.

The present disclosure also provides an error management system and method which can easily receive, via a network, error information and a crash dump file that are stored in an error collecting server, when each of service providers that provides a different online service transmits an error of a client application to the error collecting server in a predetermined format.

The present disclosure also provides an error management system and method which can collect error information and a crash dump file and store the collected error information and the crash dump file in a client terminal when a client application is abnormally terminated, and can stably transmit the stored error information and the crash dump file via a network when the client application is restarted.

The present disclosure also provides an error management system and method which can transmit error information and a crash dump file using a HyperText Transfer Protocol (HTTP), and thereby, enables any user to easily apply the error information and the crash dump file in various platform environments, and also can prevent blocking of a transmission by a router or a firewall.

The present disclosure also provides an error management system and method which can effectively reproduce an error that has occurred in a client terminal by transmitting error information and a crash dump file when a client application is abnormally terminated.

The present disclosure also provides an error management system and method which can have information about a client environment where errors frequently occur by transmitting client environment information of a client terminal when a client application is abnormally terminated.

The present disclosure also provides an error management system and method which can easily find an object file and a function with respect to error information that is collected in an error collecting server, using a table where a corresponding object file and a function are inverse-indexed for each address.

The present disclosure also provides an error management system and method which can change a selection, grouping, and an arrangement method, with respect to collected errors by simply manipulating a pointing device such as a mouse and the like.

According to an aspect of the present disclosure, there is provided an error management system for managing an error that occurs in a client application, the error management system including: a client terminal which intercepts an event, and collects error information and a crash dump file when the client application is abnormally terminated, and transmits the collected error information and the crash dump file in a predetermined format via a network; and an error collecting server which receives the error information and the crash dump file from the client terminal, and stores the received error information and the crash dump file for each online service, the error collecting server being independent from an online service server that executes a server application providing a service in correspondence to the client application.

In this case, the error collecting server may provide object file information and a function where the error has occurred, using an address included in the error information, for debugging.

According to another aspect of the present disclosure, there is provided a method of managing an error that occurs in a client application, the method including: the client application which is executed in a client terminal, interoperating with a server application which is executed in an online service server; and an error processing module which is installed in the client terminal intercepting an event, collecting error information and a crash dump file when the client application is abnormally terminated, and transmitting the collected error information and the crash dump file in a predetermined format via a network; an error collecting server receiving and storing error information about the client application from the client terminal via the network; and the error collecting server providing object file information and a function where the error has occurred, using an address included in the error information, for debugging.

In this case, the error information about the client application may be collected by an error processing module which is installed in the client terminal, and the collected error information may be transmitted in a predetermined format via the network.

Also, the error collecting server may provide source code information, or source code location, with the object file information and the function where the error has occurred. In this case, the source code location may include a source code path, a source code name, and a line number. Also, the source code path may designate a path on a computer that has created a map file.

Also, the object file designates a file that is created when compiling a source file.

Also, the function and the object file information include any type of information about the function and the object file, such as a function name, an object file name, and the like.

According to still another aspect of the present disclosure, there is provided a method of managing an error that occurs in a client application, the method including: the client application which is executed in a client terminal, interoperating with a server application which is executed in an online service server; and an error processing module installed in the client terminal intercepting an event, collecting error information and a crash dump file when the client application is abnormally terminated, and transmitting the collected error information and the crash dump file in a predetermined format via a network.

In this case, when the client application is abnormally terminated, it designates that the client application cannot be executed any more and thereby, a predetermined event has occurred. The predetermined event may be provided from an operating system (OS).

Also, intercepting the event designates performing a function that is required in an event handler with respect to the event that occurs when the client application is abnormally terminated.

Also, the error information may include at least one of a time of a point in time when the client application is abnormally terminated, a termination reason, a memory address, a call stack, module information, a register state, and version information of a corresponding program.

BRIEF DESCRIPTION OF THE DRAWINGS

The above and/or other aspects and advantages of the present disclosure will become apparent and more readily appreciated from the following detailed description, taken in conjunction with the accompanying drawings of which:

FIG. 5 is a diagram illustrating a screen where error information stored in an error collecting server is divided for each address according to an exemplary embodiment of the present disclosure;

FIG. 6 is a diagram illustrating a screen displaying an example of error information stored in an error collecting server according to an exemplary embodiment of the present disclosure; and FIG. 7 is a diagram illustrating an example of a subject setting screen for collecting error information shown in FIG. 6, according to an exemplary embodiment of the present disclosure;

FIG. 8 is a diagram illustrating an example of a screen displaying when a particular address is clicked from error information shown in FIG. 6, according to an exemplary embodiment of the present disclosure;

DETAILED DESCRIPTION

Figure 1:
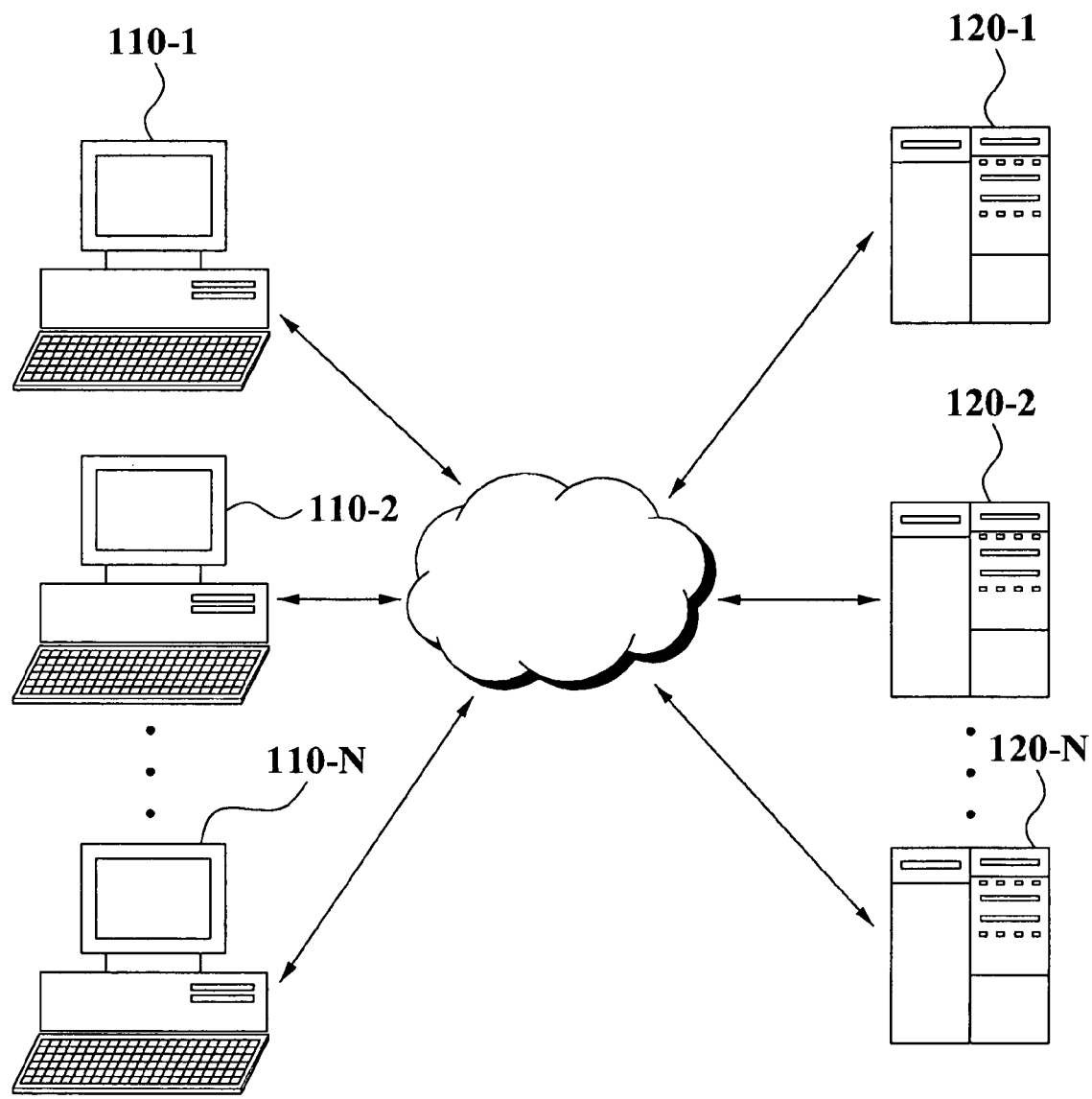
FIG. 1 is a block diagram illustrating an online service system according to a conventional art.

Reference will now be made in detail to embodiments of the present disclosure, examples of which are illustrated in the accompanying drawings, wherein like reference numerals refer to the like elements throughout. The embodiments are described below in order to explain the present disclosure by referring to the figures.

Figure 2:
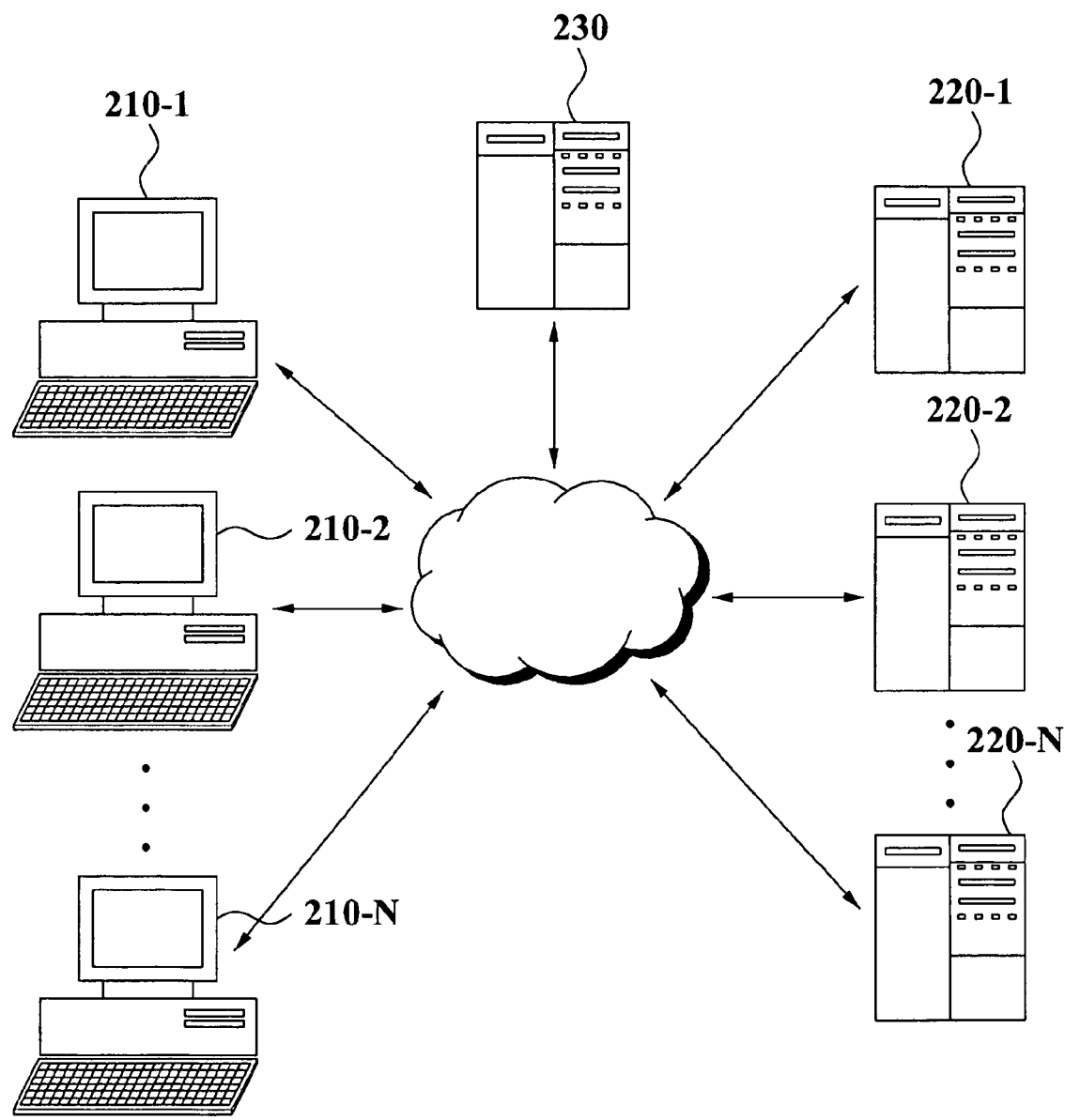
FIG. 2 is a block diagram illustrating an error management system according to an exemplary embodiment of the present disclosure.

FIG. 2 is a block diagram illustrating an error management system according to an exemplary embodiment of the present disclosure.

Referring to FIG. 2, the error management system according to the present embodiment includes client terminals 210-1, 210-2, . . . , 210-N, and online service servers 220-1, 220-2, . . . , 220-N.

Each of the client terminals 210-1, 210-2, . . . , 210-N may be a computer, a pocket personal computer (PC), a notebook computer, a personal digital assistant (PDA), a mobile phone, a game device, and the like.

A client application is installed in each of the client terminals 210-1, 210-2, . . . , 210-N. Also, at least two client applications may be installed in each of the client terminals 220-1, 220-2, . . . , 220-N.

Each client application interoperates with a server application that is installed in each of the online service servers 220-1, 220-2, . . . , 220-N. As an example, a game client for a 'You're the king of golf' game service and another game client for a 'Lineage' game service may be installed in the client terminal 210-1. In this case, the 'You're the king of golf' game service may interoperate with the server application that is installed in the online service server 220-1. Also, the 'Lineage' game service may interoperate with the server application that is installed in the online service server 220-2.

Each of the online service servers 220-1, 220-2, . . . , 220-N may execute a server application for a single online service. Also, at least two of the online service servers 220-1, 220-2, . . . , 220-N may execute the server application for the single online service. As an example, the online service servers 220-1 and 220-2 may be servers for the 'You're the king of golf' game service.

Also, an error processing module may be installed in each of the client terminals 210-1, 210-2, . . . , 210-N. When the client application that is executed in the client terminal is abnormally terminated, the error processing module intercepts an error, collects error information and a crash dump file, and transmits the collected error information and the crash dump file in a predetermined format via a network.

In this case, when the client application is abnormally terminated, it designates that the client application cannot be executed any more and thereby, a predetermined event has occurred. The predetermined event may be caused by an operating system (OS) when the client application is abnormally terminated. The OS may be window series of Microsoft Corporation, MacOS series of Apple computer Inc., PalmOS series of Palm or any type of Real-Time OS (RTOS).

As an example, the error processing module may be a computer program code which is enabled to perform a predetermined operation in an event handler.

Error information may include a system time of a point in time when the client application is abnormally terminated, an address where the error has occurred, a reason for the error, and the like. As an example, the reason for the error may be an "Access Violation" error, a "Divide By Zero" error, and the like. Also, the error information may include a call stack, register information, version information of a corresponding program when the error occurred, and module information that is used in the corresponding program when the error occurred.

The call stack designates a call relation between functions in the corresponding program when the error occurred. As an example, the call stack may be a relation where a print function is called from a main function and a GetData function is called from the print function. In this case, the call stack included in the error information may transmit only an address value of each function. A receiving side receives the error information, and may have information about the function corresponding to the transmitted address value using module information and the like. As an example, when "0x04001000 0x04000700 0x04000103" is transmitted to the call stack, the receiving side may make the GetData function correspond to '0x04001000', the print function to '0x04000700', and the main function to '0x04000103' respectively.

The register information may include data that is stored in a register of a Central Processing Unit (CPU) when the error occurred. As an example, when utilizing X86 CPU of Intel Corporation, the register information may include data that is stored in the register, such as EAX, EBX, ECX, EDX, ESI, EDI, EBP, EIP, and the like. The register information may be very usefully utilized for having information about circumstance when the error occurred.

The module information may include a name of a module, a checksum of the module, a memory address where the module is loaded, and the like.

According to embodiments, the error information may include client environment information of the client terminal. In this case, the client environment information may include a hardware type, such as a CPU and a graphic card, a device drive version that is utilized for operating the hardware, and the like. Accordingly, the receiving side, which receives the error information, may have information about hardware combination having frequent errors and thereby, cooperate with a corresponding hardware manufacturer to effectively debug the errors.

The crash dump file stores a circumstance associated with an occurrence of an error, such as information stored in memory when the error occurred, as it is, when the client application is abnormally terminated due to the occurrence of the error. Accordingly, the crash dump file may be very usefully utilized for verifying where and why a system error has occurred. As an example, the crash dump file might have been created by OS of Microsoft Corporation.

A different error processing module may be provided for each client application. Also, at least two client applications may share a single error processing module. As an example, each of a 'You're the king of golf' application and a 'Lineage' application may include a corresponding error processing module. Also, the 'You're the king of golf' application and the 'Lineage' application may share the single error processing module.

Figure 3:
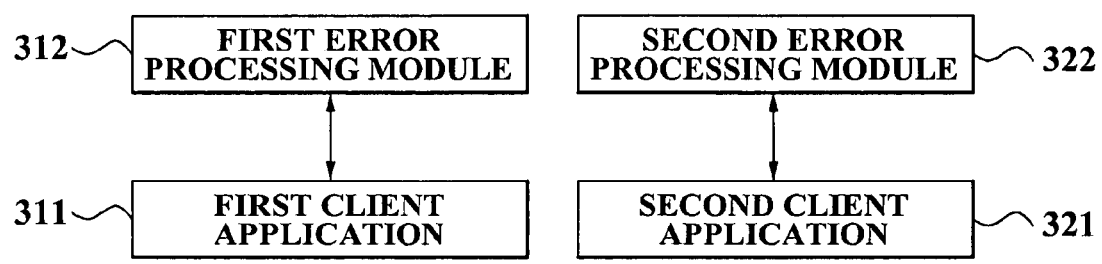
FIG. 3 is a block diagram illustrating an example of a client terminal shown in FIG. 2 according to an exemplary embodiment of the present disclosure.

FIG. 3 is a block diagram illustrating an example of the client terminal 210-1 shown in FIG. 2 according to an exemplary embodiment of the present disclosure.

Referring to FIG. 3, the client terminal 210-1 shown in FIG. 2 includes a first client application 311 and a second client application 321, and a first error processing module 312 and a second error processing module 322.

The first error processing module 312 processes an error that occurs in the first client application 311, in correspondence to the first client application 311. Also, the second error processing module 322 processes an error that occurs in the second client application 321, in correspondence to the second client application 321.

FIG. 3 illustrates an example of installing two, the first client application 311 and the second client application 321, but the present disclosure is not limited thereto. The client terminal 210-1 may include at least three client applications and also may include only a single client application. In FIG.

3, each error processing module is provided for each client application. Accordingly, a number of error processing modules is equal to the number of client applications.

Figure 4:
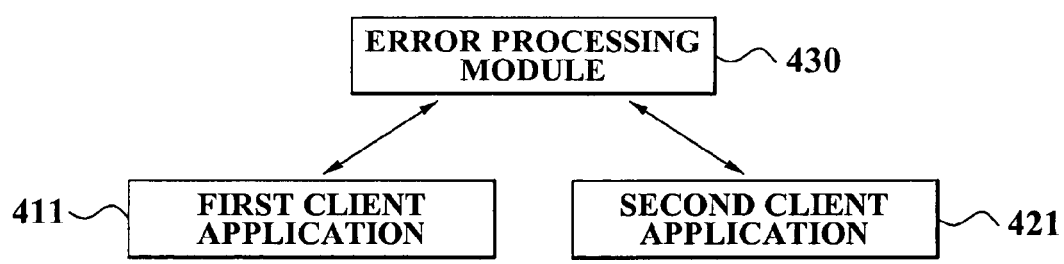
FIG. 4 is a block diagram illustrating another example of a client terminal shown in FIG. 2 according to an exemplary embodiment of the present disclosure.

FIG. 4 is a block diagram illustrating another example of the client terminal 210-1 shown in FIG. 2 according to an exemplary embodiment of the present disclosure.

Referring to FIG. 4, the client terminal 210-1 includes a first client application 411, a second client application 421, and an error processing module 430.

The error processing module 430 processes errors that occur in the first client application 411 and the second client application 421. Namely, the first client application 411 and the second client application 421 share the error processing module 430.

FIG. 4 illustrates an example of installing two, the first client application 411 and the second client application 421, but the present disclosure is not limited thereto. The client terminal 210-1 may include at least three client applications and also may include only a single client application. Also, the at least three client applications may share the single error processing module.

Although the client terminal 210-1 shown in FIG. 2 has been described above, description related to the client terminal 210 may be applied to other client terminals 210-2, . . . , 210-N shown in FIG. 2.

According to embodiments, when the client application is abnormally terminated, the error processing module collects the error information and the crash dump file, and stores the collected error information and the crash dump file in the client terminal. When the client application is restarted, the error processing module may transmit the stored error information and the crash dump file in the predetermined format via the network. When the client application is abnormally terminated, a system may be highly unstable. Accordingly, the error processing module may stably transmit the error information and the crash dump file by collecting and storing the error information and the crash dump file, and subsequently transmitting the stored error information and the crash dump file when the client application is restarted.

Also, when the client application is abnormally terminated, the error processing module may collect the error information and the crash dump file, and immediately transmit the collected error information and the crash dump file in the predetermined format via the network.

In this case, the network may be wired/wireless Internet.

The error processing module may transmit the error information and the crash dump file using a HyperText Transfer Protocol (HTTP). In this case, about 80 ports may be utilized. As described above, the error information may be easily transmitted in any type of client model using an HTTP and 80 ports. Also, it is possible to prevent blocking of a transmission which is caused by a router or a firewall.

Also, the error processing module may transmit the error information and the crash dump file in a form of a Uniform Resource Locator (URL) by using an HTTP.

Also, the error processing module may enable the error information and the crash dump file to be transmitted in an existing Internet infrastructure using a Simple Object Access Protocol (SOAP), without any unexpected blocking due to a firewall.

Referring again to FIG. 2, the error collecting server 230 receives and stores the error information and the crash dump file which are transmitted from the error processing module via the network, such as wired/wireless Internet and the like.

Also, the error collecting server 230 may store the error information and the crash dump file, which are transmitted via the network, in a separate database, such as an oracle database.

Also, the error collecting server 230 may arrange the error information and the crash dump file, which are stored in the error collecting server 230, for each address of the error that has occurred in the client application. Also, the error collecting server 230 may arrange the error information and the crash dump file, which are stored in the error collecting server 230, for each reason for the error that has occurred in the client application.

In this case, when client environment information of the client terminal is included in the error information, the error collecting server 230 may arrange the error information which is stored in the error collecting server 230, according to a type of hardware, such as a CPU or a graphic card, or a device driver version that is utilized for operating the hardware. Accordingly, the receiving side which receives the error information may have information about hardware combination having frequent errors and thereby, cooperate with a corresponding hardware manufacturer to effectively debug the errors.

Also, the error collecting server 230 may receive an address of the error which has occurred in the client application, group the error information and the crash dump file, which are stored in the error collecting server 230, for each address of the error, count a number of error occurrences of each group, and sequentially arrange the each group according to a result of the count. In this case, the address of the error is included in the error information, Also, the error collecting server 230 may receive a reason for the error which has occurred in the client application, group the error information and the crash dump file, which are stored in the error collecting server 230, for each reason for the error, count a number of error occurrences of each group, and sequentially arrange the each group according to a result of the count. In this case, the reason for the error is included in the error information.

Accordingly, every time an error occurs in the client application which is included in each of the client terminals 210-1, 210-2, . . . , 210-N, and thereby, the client application is abnormally terminated, the error information and the crash dump file are automatically transmitted from the error processing module and received in the error collecting server 230.

Also, although not shown in FIG. 2, the error management system may further include an error management terminal. The error management terminal accesses the error collecting server 230 via the network and receives the error information and the crash dump file that is stored in the error collecting server 230. In this case, the error management terminal may be a computer, a pocket PC, a notebook computer, a PDA, a mobile phone, a game device, and the like. Accordingly, the error collecting server 230 may receive and manage any type of error with respect to various types of online services. Also, an operator may easily access accumulated error information and crash dump files via the Internet and the like.

FIG. 5 is a diagram illustrating a screen where error information stored in an error collecting server is divided for each address according to an exemplary embodiment of the present disclosure.

Referring to FIG. 5, it can be seen that error information stored in the error collecting server are sequentially arranged in an order of an address having a greater number of error occurrences. As shown in FIG. 5, the error information includes an address 510 where the error has occurred, a reason for the error 520, a call stack 530, register information 540, program version information 550, module information 560, a crash dump file link 570 and a number of error occurrences 580, in an order of the greater number of error occurrences.

The address 510 where the error has occurred designates a memory address where the error has occurred, such as "10018BB9", "1000E119", and the like.

The reason for the error 520 designates the reason why the error has occurred or a type of the error, such as "EXCEPTION_FLT-DIVIDE_BY_ZERO", "EXCEPTION_ACCESS_VIOLATION", and the like. Also, the reason for the error 520 may be different according to an OS which is installed in a client computer.

The call stack 530 designates a call relation between functions in a corresponding program, when the error occurred. The call stack 530 shown in FIG. 5 designates an address value of each function.

The register information 540 designates data stored in a register of the client computer when the error occurred. As an example, the register information 540 may be designated as "EAX:FFFFFFE2 EBX:029D2420 ECX:00000000 EDX:0000001E ESI:021EC1D8 EDI:0000000F EBP:00000000 EIP:00000000 SegCs:0000001B EFlags:00010286 Esp:00000008 SegGS:00000000", and the like.

The program version information 550 designates version information of a corresponding program when the error occurred.

The module information 560 designates information about a module utilized in the corresponding program when the error occurred. The module information 560 may include a name of the module, a checksum of the module, a memory address where the module is loaded, and the like.

The crash dump file link 570 may be a link which can download a corresponding crash dump file.

As described above, a user may access the error collecting server, easily approach desired error information, and arrange the error information in a desired format. Accordingly, it is possible to manage errors which occur in the client application without difficulty. Also, since a programmer may debug an error in an order of a frequent error, the programmer may effectively debug the error of the client application.

The error collecting server 230 may extract an address of a function included in each object file which is generated by compiling a source code, and include a table where the object file and the function correspond to each address by inverse-indexing the extracted address. In this case, the inverse-indexing may designate indexing in an order of a 'particular memory address, the object file, and the function'. Also, the table may maintain an object file name and a function name in correspondence to each address. Also, the table may store source code location corresponding to the each address. In this case, the source code location may include a file path, a file name, and a number of lines in the file.

The error collecting server 230 may retrieve the object file and the function with respect to the address, which is included in the error information, from the table, and provide debugging information, such as the retrieved object file information and the function.

FIG. 6 is a diagram illustrating a screen displaying an example of error information stored in an error collecting server according to an exemplary embodiment of the present disclosure.

Referring to FIG. 6, a period section unit 610 shows that errors collected since Jun. 5, 2005 are selected. Namely, errors collected before Jun. 5, 2005, are not selected. In an example of FIG. 6, since both a selection starting day and a selection termination day are embodied in a pull-down menu, a period may be selected by simply manipulating a pointing device such as a mouse.

A query generation unit 620 generates a structured query language (SQL) query for selecting a database, grouping the database, and arranging the database, by only clicking a mouse. In FIG. 6, the query generation unit 620 enables a user to select words, which can be positioned behind command lines "select", "group by", and "order by", from the pull-down menu. Accordingly, even a user who does not know a complicated SQL grammar may easily select, group and arrange error information.

Also, the query generation unit 620 provides a table which one-to-one matches a particular query and a natural language such as Hangul. When the user selects a desired natural language from the table, the query generation unit 620 may select, group, and arrange error information using a query corresponding to the selected natural language. As an example, the query generation unit 620 may match a query corresponding to "error information for each address in an order of a greater number of error occurrences". When the user selects the "error information for each address in an order of a greater number of error occurrences", the query generation unit 620 may process error information using the matching query, and display the processed error information. Accordingly, in the case of a frequently utilized query, any user may easily use the frequently utilized query to display corresponding error information.

A query display unit 630 displays the query that is generated by the query generation unit 620.

In this case, when a natural language, such as Hangul, corresponding to "add to custom query", is inputted by clicking the "add to custom query", the query displayed in the query display unit 630 may be stored in the table by one-to-one corresponding to the inputted natural language.

A result display unit 640 displays error information according to the query which is displayed in the query display unit 630.

In FIG. 6, it can be seen from the result display unit 640 that error information stored in the error collecting server are sequentially arranged in an order of an address having a greater number of error occurrences. As shown in FIG. 6, the result display unit 640 displays an address 641 where the error has occurred, a reason for the error 642, a call stack 643, register information 644, program version information 645, module information 646, a crash dump file link 647 and a number of error occurrences 648, in an order of the greater number of error occurrences.

The address 641 where the error has occurred designates a memory address where the error has occurred, such as "10018BB9", "1000E119", and the like.

The reason for the error 642 designates the reason why the error has occurred or a type of the error, such as "EXCEPTION_FLT-DIVIDE_BY_ZERO", "EXCEPTION_ACCESS_VIOLATION", and the like. Also, the reason for the error 642 may be different according to an OS which is installed in a client computer.

The call stack 643 designates a call relation between functions in a corresponding program, when the error occurred. The call stack 643 shown in FIG. 6 designates an address value of each function.

The register information 644 designates data stored in a register of the client computer when the error occurred. As an example, the register information 644 may be designated as "EAX:FFFFFFE2 EBX:029D2420 ECX:00000000 EDX:0000001E ESI:021EC1D8 EDI:0000000F EBP:00000000

EIP:00000000 SegCs:0000001B EFlags:00010286 Esp:00000008 SegGS:00000000", and the like.

The program version information 645 designates version information of a corresponding program when the error occurred.

The module information 646 designates information about a module utilized in the corresponding program when the error occurred. The module information 646 may include a name of the module, a checksum of the module, a memory address where the module is loaded, and the like.

The crash dump file link 647 may be a link which can download a corresponding crash dump file.

As described above, a user may access the error collecting server, easily approach desired error information, and arrange the error information in a desired format. Accordingly, it is possible to manage errors which occur in the client application without difficulty. Also, since a programmer may debug an error in an order of a frequent error, the programmer may effectively debug the error of the client application.

According to embodiments, when each field of the result display unit 640 is selected, detailed information corresponding to the selected field may be displayed. Also, the error information may be sequentially arranged based on the selected field. As an example, in FIG. 6, when a field for '10018BB9' of the address 641 is selected, detailed information about errors that have occurred in the '10018BB9' address may be displayed. Also, when a field for 'version' of the program version information 645 is selected using a pointing device such as a mouse, error information may be sequentially arranged in an order of a program version.

FIG. 7 is a diagram illustrating an example of a subject setting screen for collecting error information shown in FIG. 6, according to an exemplary embodiment of the present disclosure.

Referring to FIG. 7, it can be seen that a field name 710, a field type 720, a null unit 730, a key 740, a default 750, extra information 760, and a delete button 770 can be setting for each item, so as to collect information about the address 641 where the error has occurred, the reason for the error 642, the call stack 643, the register information 644, the program version information 645, the module information 646, and the crash dump file link 647, which are shown in FIG. 6.

The field name 710 corresponds to a name of each column of the result display unit 640 shown in FIG. 6, and includes an "address", a "reason", and the like.

The field type 720 designates a data type of items corresponding to each column of the result display unit 640.

The null unit 730 designates whether a corresponding item can be deleted. As an example, when the null unit 730 is set as "YES", the corresponding item may be deleted when transmitting/receiving error information. Also, when the null unit 730 is set as "NO", the corresponding item must be included in the error information when transmitting/receiving the error information.

The key 740 designates a key value in a database.

The default 750 designates a default value to be applied when a corresponding item is not transmitted from a client side, since the corresponding item may be deleted when the null unit 730 is set as "YES".

The extra information 760 is for setting extra information which is necessary for each item.

The delete button 770 is for deleting the corresponding item.

A client terminal may collect the error information as displayed in the result display unit 640 of FIG. 6 by setting up necessary items as shown in FIG. 7, creating a subject, and setting a client program so that a client side transmits error information corresponding to each item of the created subject. When an additional item is required, the additional item is additionally registered in the subject shown in FIG. 7. Also, the field name 710, the field type 720, the null unit 730, the key 740, the default 750 and the extra information 760 may be set. When any of the set items is determined to be unnecessary, a corresponding item may be deleted by using the delete button 770.

FIG. 8 is a diagram illustrating an example of a screen displaying when a particular address is clicked from error information shown in FIG. 6, according to an exemplary embodiment of the present disclosure.

Referring to FIG. 8, when a field corresponding to addresses in the address 641 or the call stack 643 is clicked from fields displayed in the result display unit 640 of FIG. 6, it can be seen that a corresponding address 810, a module 820 corresponding to the corresponding address 810, function/object file information 830 corresponding to the corresponding address 810, and source code location 840 are displayed while tracing a call stack from the clicked address.

The corresponding address 810 designates an address corresponding to each function, while tracing a function that called another function where an error has occurred, from the other function, according to a call relation between the functions.

The module 820 designates a module which includes a function corresponding to the corresponding address 810.

The function/object file information 830 designates information about a function corresponding to the corresponding address 810 and an object file of the function. Also, the function/object file information 830 may include a function name and an object file name.

The source code location 840 designates a file path of a source code corresponding to the corresponding address 810, a file name and a line number.

Also, each of the address, the module, the function, the object file, and the source may correspond to each other using a table where a corresponding object file and a function are inverse-indexed for each address, the table made by compiling all source codes of an application and extracting an address corresponding to a function for each object file.

As shown in FIG. 8, an error collecting server of an error management system according to the present disclosure provides a module corresponding to an address where an error has occurred, a function, an object file, and a source code. Accordingly, an online service programmer may easily debug an error of a client application.

Figure 9:
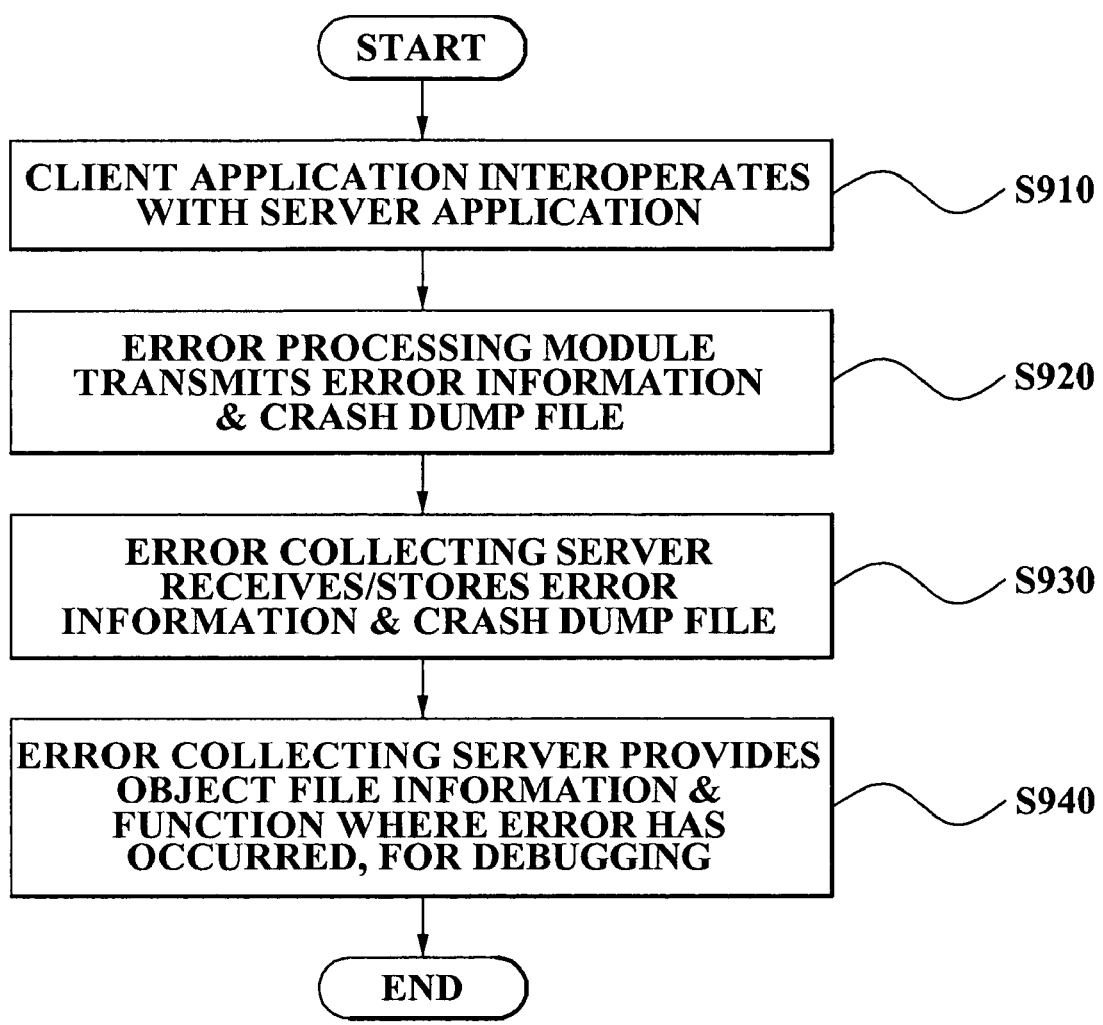
FIG. 9 is a flowchart illustrating a method of managing an error according to an exemplary embodiment of the present disclosure.

FIG. 9 is a flowchart illustrating a method of managing an error according to an exemplary embodiment of the present disclosure.

Referring to FIG. 9, in the error management method according to the present embodiment, in operation S910, a client application interoperates with a server application via a network. In this case, the client application is executed in a client terminal, and the server application is executed in an online service server In this case, at least two client terminals where the client application is installed may exist. Also, at least two service servers which provide different server applications respectively may exist. Also, at least two client applications may be installed in a single client terminal.

In operation S920, when the client application is abnormally terminated, an error processing module, which is installed in the client terminal, intercepts an event, collects error information and a crash dump file, and transmits the collected error information and the crash dump file in a predetermined format via the network.

In this case, the error processing module may be provided to correspond to each client application. Also, at least two client applications may share a single error processing module.

Also, intercepting the event designates performing a function that is required in an event handler with respect to the event that occurs when the client application is abnormally terminated. Namely, a function of collecting the error information and the crash dump file and transmitting the collected error information and the crash dump file in the predetermined format via the network may be assigned to the event handler with respect to the event occurring when the client application is abnormally terminated.

Also, in operation S920, it is possible to sequentially perform intercepting the event, collecting the error information and the crash dump file, and storing the collected error information and the crash dump file in the client terminal, when the client application is abnormally terminated; and transmitting the error information and the crash dump file in the predetermined format via the network when the client application is restarted.

Also, the error information and the crash dump file may be transmitted using an HTTP and 80 ports via the network. Accordingly, the error information may be easily transmitted in any type of client model. Also, it is possible to prevent blocking of a transmission which is caused by a router or a firewall. Generally, the error information and the crash dump file may be transmitted in a form of a URL.

In operation S930, when the error information and the crash dump file are transmitted, an error collecting server receives and stores the error information and the crash dump file which are transmitted from the client terminal via the network.

In this case, the error information and the crash dump file which are stored in the error collecting server may be arranged for each address of the error that has occurred in the client application. Also, the error information and the crash dump file which are stored in the error collecting server may be arranged for each reason for the error that has occurred in the client application.

In operation S940, the error collecting server provides object file information and a function where the error has occurred, using an address included in the error information, for debugging.

In this case, operation S940 of providing the object file information and the function where the error has occurred may include extracting an address of a function included in each object file which is generated by compiling a source code, and maintaining a table where the object file and the function correspond to each address by inverse-indexing the extracted address; and retrieving the object file and the function with respect to the address included in the error information, from the table, and providing the retrieved object file information and the function.

According to embodiments, the error management method may display detailed information of a selected field or arrange the error information, based on the selected field, when the field of an error information screen displayed on the error management terminal is selected, process the error information according to an SQL query and display the processed error information, when the SQL query is generated from a pull-down menu, and include a table which stores an SQL query corresponding to a natural language, and when the natural language is selected, process the error information according to the SQL query corresponding to the selected natural language, and display the processed error information.

Each operation shown in FIG. 9 may be performed in an order shown in FIG. 9 or in an inversed order to the order shown in FIG. 9.

Figure 10:
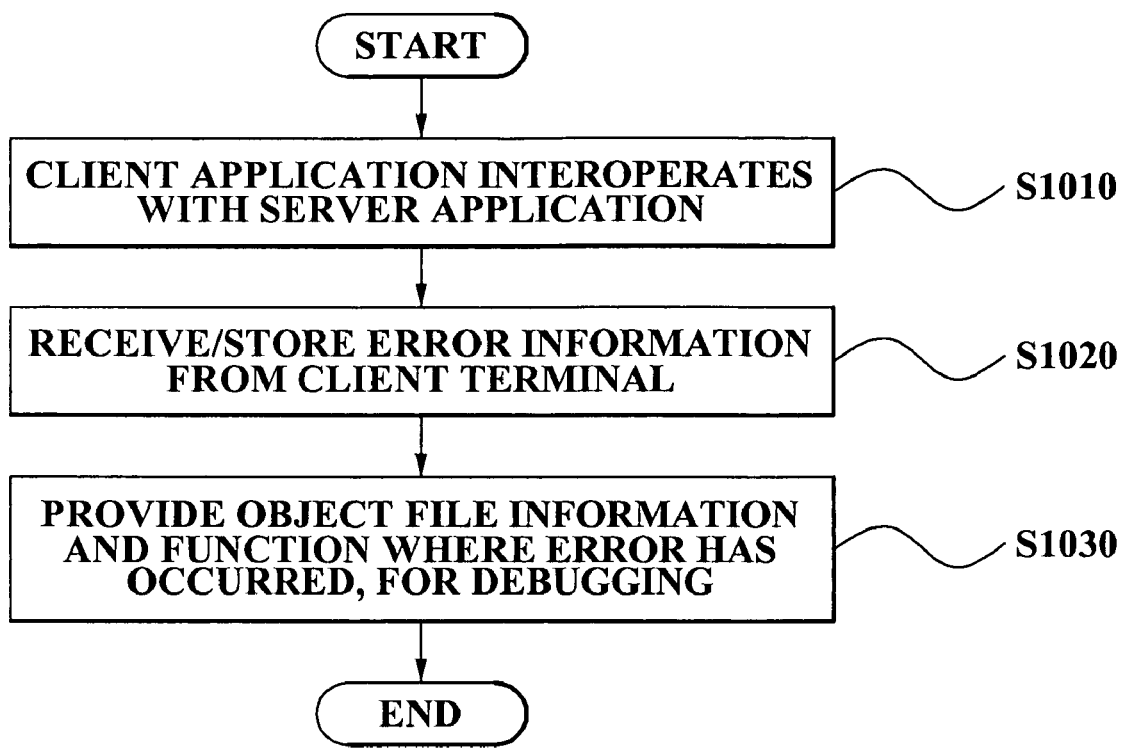
FIG. 10 is a flowchart illustrating a method of managing an error according to an exemplary embodiment of the present disclosure.

FIG. 10 is a flowchart illustrating a method of managing an error according to an exemplary embodiment of the present disclosure.

Referring to FIG. 10, in the error management method according to the present embodiment, in operation S1010, a client application interoperates with a server application via a network. In this case, the client application is executed in a client terminal, and the server application is executed in an online service server In this case, at least two client terminals where the client application is installed may exist. Also, at least two service servers which provide different server applications respectively may exist. Also, at least two client applications may be installed in a single client terminal.

In operation S1020, the error management method receives and store error information about the client application which is transmitted from the client terminal via the network.

In operation S1030, when debugging, the error management method provides debugging information, such as objection file information and the function where the error has occurred, using the address included in the error information.

Detailed description related to operation S940 shown in FIG. 9 may be applied to operation S1030 shown in FIG. 10. Accordingly, further detailed description related to operation S1030 will be omitted.

Each operation shown in FIG. 10 may be performed in an order shown in FIG. 10 or in an inversed order to the order shown in FIG. 10.

The error management method according to the above-described exemplary embodiment of the present disclosure may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure.

According to the present disclosure, there is provided an error management system and method which can intercept an event and collect error information and a crash dump file when an error occurs in a client application, and transmit the collected error information and the crash dump file, and thereby, can easily collect the error of the client application without a need for a user to report the error.

Also, according to the present disclosure, there is provided an error management system and method which can easily receive, via a network, error information and a crash dump file that are stored in an error collecting server, when each of service providers that provides a different online service transmits an error of a client application to the error collecting server in a predetermined format.

Also, according to the present disclosure, there is provided an error management system and method which can collect error information and a crash dump file and store the collected error information and the crash dump file in a client terminal when a client application is abnormally terminated, and can stably transmit the stored error information and the crash dump file via a network when the client application is restarted.

Also, according to the present disclosure, there is provided an error management system and method which can transmit error information and a crash dump file using an HTTP and thereby, enables any user to easily apply the error information and the crash dump file in various platform environments, and also can prevent blocking of a transmission by a router or a firewall.

Also, according to the present disclosure, there is provided an error management system and method which can effectively reproduce an error that has occurred in a client terminal by transmitting error information and a crash dump file when a client application is abnormally terminated.

Also, according to the present disclosure, there is provided an error management system and method which can have information about a client environment where errors frequently occur by transmitting client environment information of a client terminal when a client application is abnormally terminated.

Also, according to the present disclosure, there is provided an error management system and method which can easily find an object file and a function with respect to error information that is collected in an error collecting server, using a table where a corresponding object file and a function are inverse-indexed for each address.

Also, according to the present disclosure, there is provided an error management system and method which can change a selection, grouping, and an arrangement method, with respect to collected errors by simply manipulating a pointing device such as a mouse and the like.

Although a few exemplary embodiments of the present disclosure have been shown and described, the present disclosure is not limited to the described exemplary embodiments. Instead, it would be appreciated by those skilled in the art that changes may be made to these exemplary embodiments without departing from the principles and spirit of the disclosure, the scope of which is defined by the claims and their equivalents.

What is claimed is:

1. An event collecting server system comprising:
   a receiving module configured to receive information on an event in a client application when the client application is abnormally terminated, wherein the receiving module is configured to extract an address of the event by compiling source code of an object file, wherein the object file includes a function of identifying where the event has occurred; and
   a storage module configured to store the received information in association with an online service with which the information is associated.

2. The system of claim 1, wherein the information comprises error data.

3. The system of claim 1, wherein the information includes an address for the event and an object file including a function where the event has occurred, and wherein the receiving module uses the address to provide information on the object file.

4. The system of claim 1, further comprising:
   a processing module configured to count a number of event occurrences for the address, wherein the event occurrence includes an association between the information and the crash dump file.

5. The system of claim 1, wherein the storage module is configured to store a table where the object file and the function are associated with the address by inverse-indexing, and wherein the object file is retrieved by reference to the address.

6. The system of claim 1, further comprising:
   a processing module configured to generate an SQL query from a pull-down type menu and process the information according to the SQL query.

7. The system of claim 1, wherein the storage module is further configured to store an SQL query corresponding to a natural language, and further comprising:
   a processing module configured to process the information according to the SQL query when the natural language is selected; and
   a display module configured to display the processed information.

8. The system of claim 1, further comprising:
   a display module configured to display an information table including module information, function information, object file information, and a source code location corresponding to an address of the event.

9. The system of claim 1, further comprising:
   a display module configured to display a list of the information which includes an address of the event and a crash dump file related to the event, wherein the list is ordered by the number of event occurrences for each address.

10. The system of claim 1, further comprising:
    an event management terminal comprising:
    a communication module configured to receive information including a crash dump file from the storage module.

11. An event collecting server system comprising:
    a receiving module configured to receive information on an event in a client application when the client application is abnormally terminated, wherein the information includes a crash dump file, wherein the receiving module is configured to extract an address of the event by compiling source code of an object file, wherein the object file includes a function of identifying where the event has occurred;
    a storage module configured to store the received information in association with an online service with which the information is associated; and
    a display module configured to display a list of the information which includes a reason for the event and a crash dump file related to the event, wherein the list is ordered by the number of event occurrences for each reason.

12. The system of claim 11, wherein the event management terminal further comprises:
    a display module configured to display an information screen with at least one selectable field, and further configured to display information of the at least one selectable field or arrange the information in response to selecting the at least one selectable field.

13. The system of claim 12, wherein the display module provides a link to the crash dump file to enable a user of the event management module to download the crash dump file.

14. An event collecting server system comprising
    a receiving module configured to receive information on an event in a client application when the client application is abnormally terminated, wherein the information includes a crash dump file and a reason for the event in the client application, wherein the receiving module is configured to extract an address of the event by compiling source code of an object file, wherein the object file includes a function of identifying where the event has occurred;

a storage module configured to store the received information in association with an online service with which the information is associated; and a processing module configured to create a link for the crash dump file for each reason for the event and configured to count the number of event occurrences for each reason.

15. A method of collecting event information comprising:

receiving information on an event in a client application when the client application is abnormally terminated, wherein the information includes a crash dump file;

storing the received information in association with an online service with which the information is associated;

extracting an address of the event by compiling source code of an object file including the function where the event has occurred;

generating a table where the object file and the function are associated with the address by inverse-indexing; and retrieving from the table the object file and the function by reference to the address included in the event information.

16. The method of claim 15, wherein the information comprises error data.

17. The method of claim 15, wherein the information includes an address for the event and an object file including a function where the event has occurred, and further comprising:

providing information on the object file using the address.

18. The method of claim 15, further comprising:

displaying an information screen with at least one selectable field;

displaying information of the at least one selectable field or arranging the information in response to selecting the at least one selectable field;

generating an SQL query from a pull-down type menu;

processing the information according to the SQL query; and displaying the processed information.

* * * * *